United States Patent Office 3,079,417
Patented Feb. 26, 1963

3,079,417
OLEFINIC PHOSPHATE TRIESTERS AND PROCESS FOR MAKING SAME
Martin W. Farrar, Webster Groves, Mo., assignor to Monsanto Chemical Company, St. Louis, Mo., a corporation of Delaware
No Drawing. Filed Oct. 29, 1959, Ser. No. 849,461
17 Claims. (Cl. 260—461)

This invention relates to a novel method for the preparation of new phosphates of the structure

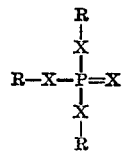

where R is a radical of the structure

where $R_1$ is either an alkyl or an aryl radical, $R_2$ is either hydrogen or an alkyl radical, but $R_1$ and $R_2$ can together with the

radical be a cycloalkenyl radical, and X is oxygen or sulfur. These new phosphates are prepared by a novel method which basically involves reacting, in the presence of a tertiary amine, phosphoryl chloride or thiophosphoryl chloride with a ketone of the structure

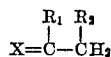

where $R_1$ is either an alkyl or aryl radical, $R_2$ is either hydrogen or an alkyl radical, but $R_1$ and $R_2$ can together with the

radical be a cycloalkylidene radical and X is oxygen or sulfur.

These new compounds can be used to impart flameproofing properties to styrene-maleic modified alkyds by replacing a part (up to about 10%) of the styrene or they can be used as thermosetting molding materials for producing shaped plastic articles which are flame resistant. Also, those phosphates of this invention in which X is oxygen are quite suitable for use as additives in distillate fuels, such as the hydrocarbons of the gasoline boiling range which contain well-known organo-metallic additives, such as tetraethyl-lead, in which they function as glow suppressants and lead scavengers. Generally, it is desirable to add the compounds of this invention in an amount sufficient to provide from about 0.01 to 2.0 mols of phosphorus per mol of metal. Of the new phosphates in which X is sulfur, those wherein R is an alkenyl radical of more than 4 carbon atoms are useful as additives for mineral lubricating oils to impart extreme pressure properties thereto when used in concentrations of at least 0.5% by weight based upon the mineral oil, whereas those having 1-4 carbon atoms have insecticidal activity towards aphids and other similar insects which attack plants by sucking their juices. For such insecticidal use the compounds of this invention can be applied to the foliage of plants as water base sprays, such sprays being prepared in a suitable manner, as by dispersion of the compounds in water, using conventional emulsifying agents such as the higher-alkylbenzenesulfonates, with or without the use of a water-immiscible solvent, the concentration of the active compound being about 1% or less.

The following non-limiting examples will further illustrate the preparation of our new compounds by the method of this invention. Parts are parts by weight unless otherwise stated.

Example 1

To a suitable reaction vessel capable of withstanding super- and sub-atmospheric pressures and having agitation means, means for heating and cooling its contents, means for the measurement of temperature and pressure and means for the addition and removal of solids and liquids, there is charged 150 cc. of dry benzene, 98 parts of cyclohexanone and 95 parts of pyridine. To the resulting mixture 51 parts of phosphoryl chloride is added dropwise over a period of about 45 minutes while maintaining the reaction mixture at a temperature of about 25–30° C. After completing the addition of the phosphoryl chloride the mixture is refluxed for 4 to 8 hours, washed with water and dried. The benzene is removed by distillation to yield tricyclohexenyl phosphate which boils at 250° C. at 1 mm. of mercury absolute.

Example 2

To a suitable reaction vessel there is charged 150 cc. of dry benzene, 72 parts of acetophenone and 51.2 parts of pyridine. To this mixture there is slowly added over a period of about 30 minutes and while keeping the reaction mixture at a temperature of about 25–30° C., 30.7 parts of phosphoryl chloride. The reaction mixture is then refluxed for 4 to 8 hours after which water is added. The resulting phases are separated and the benzene phase washed with water and then dried. The benzene is removed by distillation to yield a semi-solid material which in turn is distilled to yield tri-alpha-styryl phosphate, a yellow colored material which can be polymerized to a plastic composition.

Example 3

In a manner similar to the procedure of Example 1, 114 parts of di-n-propyl ketone, 95 parts of pyridine and 51 parts of phosphoryl chloride are used to prepare about 26 parts of triheptenyl phosphate, an amber liquid.

Example 4

To a suitable reaction vessel is charged 200 cc. of dry toluene, 116 parts of hexanthione-3, and 200 parts of tributylamine. To this mixture there is slowly added while keeping the reaction mixture at a temperature of about 30° C., 170 parts of thiophosphoryl chloride. Thereafter the reaction mixture is refluxed for 4 to 8 hours and water is added. The resulting phases are separated and the toluene phase is washed with water and dried. After removal of the toluene by distillation and fractionation of the material remaining after removal of the toluene, there is recovered about 180 parts of trihexenyl tetrathiophosphate.

Generally following the above procedure other phosphates of the type described can be prepared, such as tri-propenyl phosphate, tri-butenyl phosphate, tri-pentenyl phosphate, tri-hexenyl phosphate, tri-octenyl phosphate, tri-decenyl phosphate, tri-cyclopentenyl phosphate, tri-cyclooctenyl phosphate, tris(1-phenyl-1-propenyl) phosphate, tris(1-phenyl-2-propenyl) phosphate, tris(1-naphthyl vinyl) phosphate, tris(1-phenyl-1-butenyl) phosphate, tris(1-phenyl-2-heptenyl) phosphate, and the like. In addition to pyridine as the hydrogen chloride acceptor there can be used other tertiary amines such as triethylamine, quinoline, dimethyl cyclohexylamine, dimethyl aniline, tributylamine or other acceptors which do not interfere with the reaction, as by reacting with the $POCl_3$ or $PSCl_3$.

Examples of ketones which can be used in this invention are the aliphatic ketones, e.g. acetone, methyl ethyl ketone, diethyl ketone, methyl isopropyl ketone, isopropyl sec-butyl ketone, hexanone-2, hexanone-3, octanone-2; the cycloaliphatic ketones, e.g. cyclopentanone, cyclohexanone, cycloheptanone, cyclooctanone; and the aryl alkyl ketones, e.g. phenyl propyl ketone, phenyl butyl ketone, phenyl hexyl ketone, phenyl octyl ketone, tolyl ethyl ketone, xylyl propyl ketone, naphthyl propyl ketone.

Other modes of applying the principles of this invention will be apparent to those skilled in the art. Accordingly, while this invention has been described by reference to various specific examples and embodiments, it is to be understood that the invention is not limited thereto and that it can be variously practiced within the scope of the following claims.

What is claimed is:
1. Phosphates represented by the structure

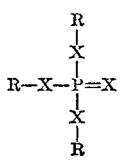

wherein R is a radical of the structure

where $R_1$ is selected from the group consisting of phenyl and naphthyl radicals, $R_2$ is selected from the group consisting of hydrogen and alkyl radicals, the sum of the carbon atoms of $R_1$ and $R_2$ being up to 13, except that $R_1$ and $R_2$ together with the $$-\overset{|}{C}=\overset{|}{C}H$$

radical can be a cycloalkenyl radical, and X is selected from the group consisting of oxygen and sulfur.

2. Phosphates of claim 1 where X is sulfur.
3. Phosphates of claim 1 where X is oxygen.
4. Phosphates of claim 1 where $R_1$ and $R_2$ together with the

radical forms a cycloalkenyl radical.
5. Phosphates of claim 3 where $R_1$ and $R_2$ together with the

radical forms a cycloalkenyl radical.
6. Tricyclohexenyl phosphate wherein the double bond is in the $\alpha,\beta$ position.
7. Phosphates of claim 1 where $R_1$ is a phenyl radical and $R_2$ is hydrogen.
8. Phosphates of claim 3 where $R_1$ is a phenyl radical and $R_2$ is hydrogen.
9. Tri-alpha-styryl phosphate.

10. In a method for producing the phosphates represented by the structure

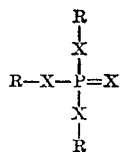

where R is a radical of the structure

where $R_1$ is selected from the group consisting of alkyl, phenyl and naphthyl radicals, $R_2$ is selected from the group consisting of hydrogen and alkyl radicals, the sum of the carbon atoms of $R_1$ and $R_2$ being up to 13, except that $R_1$ and $R_2$ together with the

radical can be a cycloalkenyl radical, and X is selected from the group consisting of oxygen and sulfur, the step comprising reacting in the presence of a tertiary amine a compound selected from the group consisting of phosphoryl chloride and thiophosphoryl chloride with a ketone of the structure

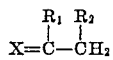

where $R_1$, $R_2$ and X have the aforedescribed significance.

11. A method of claim 10 where X is oxygen.
12. A method of claim 10 where X is sulfur.
13. In a method for producing the phosphates of claim 5, the step comprising reacting phosphorous oxychloride and an alicyclic mono-ketone in the presence of a tertiary amine.
14. In a method for producing the phosphates of claim 8, the step comprising reacting phosphorous oxychloride and a mono-ketone of the structure

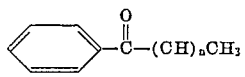

wherein $n$ is an integer in the presence of a tertiary amine.
15. In a method for producing tri-alkenyl phosphates wherein the double bond is in the alpha,beta position, the step comprising reacting phosphorous oxychloride and an aliphatic mono-ketone in the presence of a tertiary amine.
16. In a method for producing tri-cyclohexenyl phosphate, the step comprising reacting phosphorous oxychloride and cyclohexanone in the presence of a tertiary amine.
17. In a method for producing tri-alpha-styryl phosphate the step comprising reacting phosphorus oxychloride with acetophenone in the presence of a tertiary amine.

References Cited in the file of this patent
UNITED STATES PATENTS

| | | |
|---|---|---|
| 2,176,416 | Britton et al. | Oct. 17, 1939 |
| 2,546,422 | Cross | Mar. 27, 1951 |
| 2,557,805 | Upson | June 19, 1951 |
| 2,574,515 | Walter et al. | Nov. 13, 1951 |
| 2,589,326 | Oberright et al. | Mar. 18, 1952 |

FOREIGN PATENTS

| | | |
|---|---|---|
| 285,038 | Switzerland | Dec. 16, 1952 |

OTHER REFERENCES
Gefter et al.: Chemical Abstracts 52, 295 (1958).